United States Patent [19]

Lippman et al.

[11] 3,748,476
[45] July 24, 1973

[54] RADIATION INDICATOR

[75] Inventors: Robert L. Lippman, Edgewater, N.J.; John C. Sunderland, New York, N.Y.

[73] Assignee: Capintec, Inc., Mt. Vernon, N.Y.

[22] Filed: Sept. 23, 1971

[21] Appl. No.: 183,078

[52] U.S. Cl. .......................... 250/83.6 R, 250/83 C
[51] Int. Cl. .............................................. G01t 1/18
[58] Field of Search ...................... 250/83 C, 83.6 R

[56] References Cited
UNITED STATES PATENTS 2,951,161   8/1960   Foster et al. ................... 250/83 C X
3,619,613   11/1971  Chope ............................ 250/83 C X
3,666,953   5/1972   Splichal, Jr. ................. 250/83.6 R X

*Primary Examiner*—Archie R. Borchelt
*Attorney*—Martin, Fleit et al.

[57] ABSTRACT

A radiation indicator for receiving extremely small currents, such as from an ionization chamber, and for converting same to a visual output indicative of the strength of a radioactive source under test. The radiation indicator includes a varactor bridge operational amplifier circuit, a circuit for eliminating the effects of background radiation, a calibration circuit for adjusting the gain of the radiation indicator in accordance with known radioisotope characteristics, a six-position range adjustment, and circuitry for optimizing the compromise between noise and response time.

10 Claims, 2 Drawing Figures

INVENTORS
JOHN C. SUNDERLAND
ROBERT L. LIPPMAN

INVENTORS
JOHN C. SUNDERLAND
ROBERT L. LIPPMAN
BY Fleit, Gipple & Jacobson
ATTORNEYS

RADIATION INDICATOR

BACKGROUND OF THE INVENTION

There are a number of radiation indicators presently known to the prior art. Basically, each of these indicators is adapted to receive low-current signals from the output of an ionization chamber, to amplify such signals and to ultimately develop a visual output which is indictive of the strength of the radioactive source housed within the ionization chamber.

But each of the known radiation indicators is plagued by one or more of several existing drawbacks. Some known radiation indicators have low sensitivity, poor linearity and suffer from instabilities. Others are affected by background radiation. Many are extremely sensitive to mechanical shock, and most are quite expensive. Further, several of the known radiation indicators have either extremely high inherent noise levels or have extremely slow response time.

It is toward the elimination or reduction of the drawbacks noted above, that the present invention is directed.

SUMMARY OF THE INVENTION

The present invention relates to a radiation indicator particularly suitable for use with an ionization chamber issuing low current DC signals proportional to the strength of a radioactive source housed therein. The inventive radiation indicator is of all solid state design, is extremely sensitive, has excellent linearily and stability in its response, is provided with circuitry for eliminating the effects of background radiation, is rugged, relatively inexpensive when compared with prior art indicators, and optimizes the compromise between noise and response time.

The basic element of the inventive radiation indicator is a varactor bridge operational amplifier. This solid state construction, compared with the conventional mechanical vibrating capacitor construction, results in a more rugged design enjoying an increase in sensitivity and a decrease in expense.

The inventive radiation indicator includes a section for eliminating the effects of background radiation. Basically, the background radiation elimination section takes the form of an adjustable stable current source consisting of a voltage divider potentiometer and a high value resistor. This divider is adjusted to give a meter reading of zero in the absence of a radioactive source. Therefore, when a source is placed in the ionization chamber, the meter reading is indicative of the strength of only the source; that is, the meter reading is totally independent of all signals extraneous to the radioactive source.

The inventive radiation indicator is provided with circuitry for optimizing the necessary compromise between noise and response time. As noted previously, the inventive radiation indicator is provided with a six-position range adjustment section, one position for microcuries (0–200 $\mu$ Ci), three for milicuries (0–2 mCi, 0–20 mCi, 0–200 mCi) and two for curies (0–2 Ci, 0–20 Ci). Because of the extreme sensitivity of the two most sensitive settings, noise becomes an important factor. Filtering capacitors appropriate to each of these ranges are therefore added to the operational amplifier circuit in such a way to operate in the desired range and have no effect on other ranges. This technique serves to filter out most of the noise. While it is true that the noise reducing capacitors increase the response time of the circuit, this technique of incorporating them provides for each range of the instrument, the optimum compromise between noise and response time.

The inventive radiation indicator is also provided with a gain adjustment section for adapting the radiation indicator to indicate the strengths of various radioisotopes. In this manner, when the particular type of radioisotope under study is known, and when a calibration scale is available, it is possible to adjust the gain of the radiation indicator so that the output meter gives a true reading of the strength of the radioactive source.

Accordingly, it is the main object of the present invention to provide a radiation indicator which is extremely sensitive, relatively inexpensive, and yet rugged.

It is a further object of the present invention to provide a radiation indicator which has high stability and which linearly indicates the strength of radioactive sources.

Yet another object of the present invention is to provide a radiation indicator whose output is unaffected by background radiation.

Still a further object of the present invention is to provide a radiation indicator which optimizes the compromise between noise and response time.

These and other objects of the present invention, as well as many of the attendant advantages thereof, will become more readily apparent when reference is made to the following description taken in conjunction with the accompanying drawings.

DETAILED DESCRIPTION OF THE DRAWINGS

Figure 1:
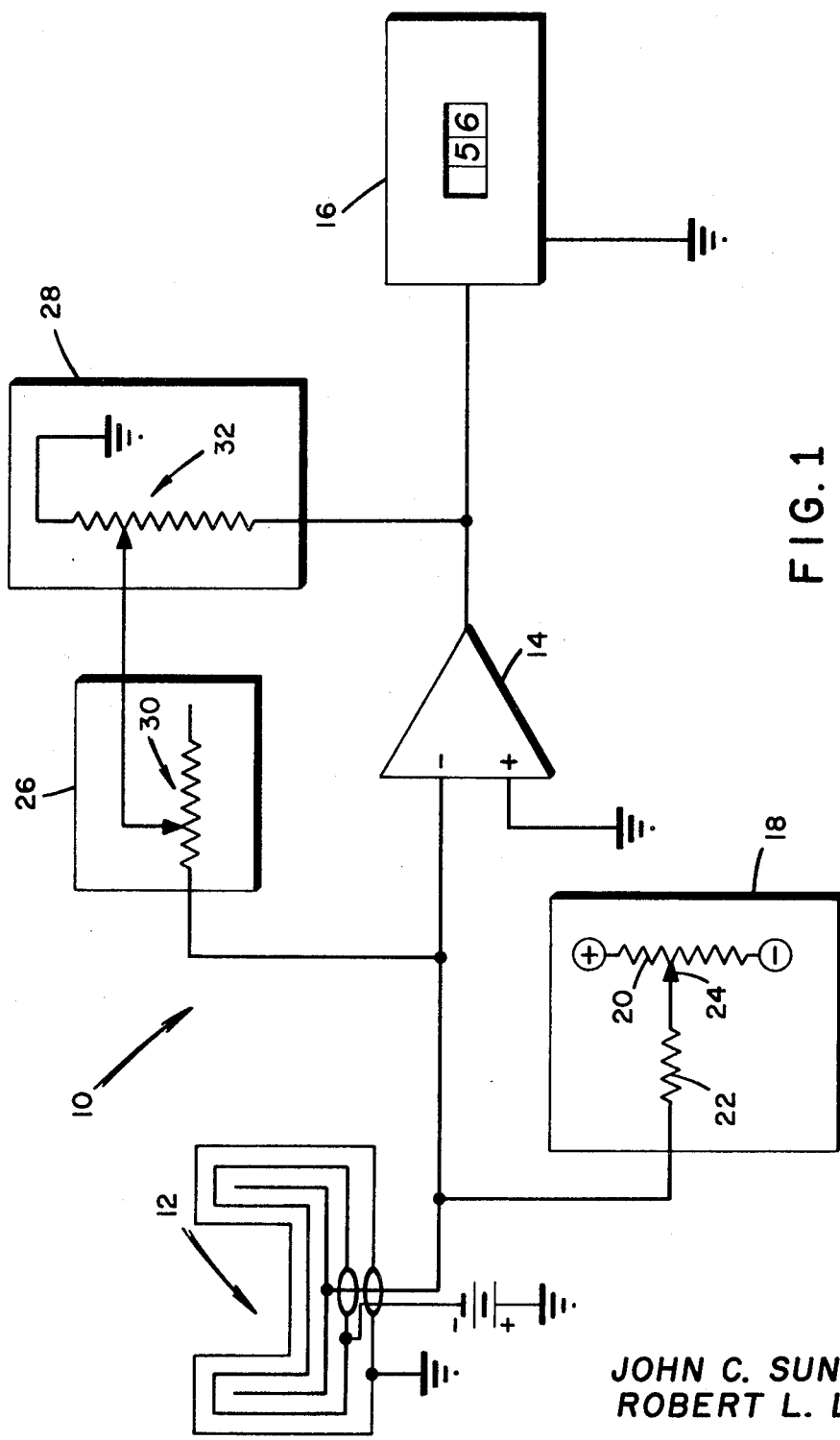
FIG. 1 is a simplified block diagram illustrating the circuit forming a part of the present invention.

With reference first to FIG. 1, the basic elements included in the inventive radiation indicator will be described. The radiation indicator is shown generally at 10 and uses, as its input signal, a small output current from an ionization chamber shown generally at 12. The ionization chamber is well known, will not be described herein, and may be of the type disclosed in U.S. Pat. No. 3,091,716 issued on May 28, 1963. The basic element of the radiation indicator 10 is a varactor bridge operational amplifier 14, the output of which amplifier is fed to a display device taking, for example, the form of a digital voltmeter 16.

As stated above, the inventive radiation indicator is provided with means for eliminating the effects of background radiation. This is accomplished by a background nulling circuit shown at 18 in FIG. 1. Basically, circuit 18 comprises a voltage divider including a variable tapped resistor 20 across which a biasing potential is applied, and a fixed stable high value resistor 22 in series with the variable tap 24 from resistor 20. The background nulling circuit 18 operates as follows. The ionization chamber 12 is activated, but contains no radioactive source. Then the variable tap 24 is adjusted until the digital voltmeter 16 reads zero. In this manner, all undesirable currents (i.e. those not due to the radioactive source to be measured) including those from background radiation, leakage paths, etc., are accounted for, so that when a radioactive source is ultimately placed in the ionization chamber, the output of the meter is controlled only by signals related to such radioactive source.

As is also noted above, the inventive radiation indicator 10 is provided with circuitry for adjusting gain in accordance with appropriate ranges of operation of the display device 16. Further, the inventive radiation indicator 10 is provided with circuitry for adjusting gain for purposes of calibrating the circuit for particular radioisotopes. The range setting circuit is shown at 26 in FIG. 1 and is shown schematically to comprise a variable tapped resistor 30. Scale indication lamps (not shown in FIG. 1) are also a part of the inventive indicator. The calibration circuit is shown schematically in FIG. 1 at 28 and is represented simply by a variable tapped resistor 32.

Figure 2:
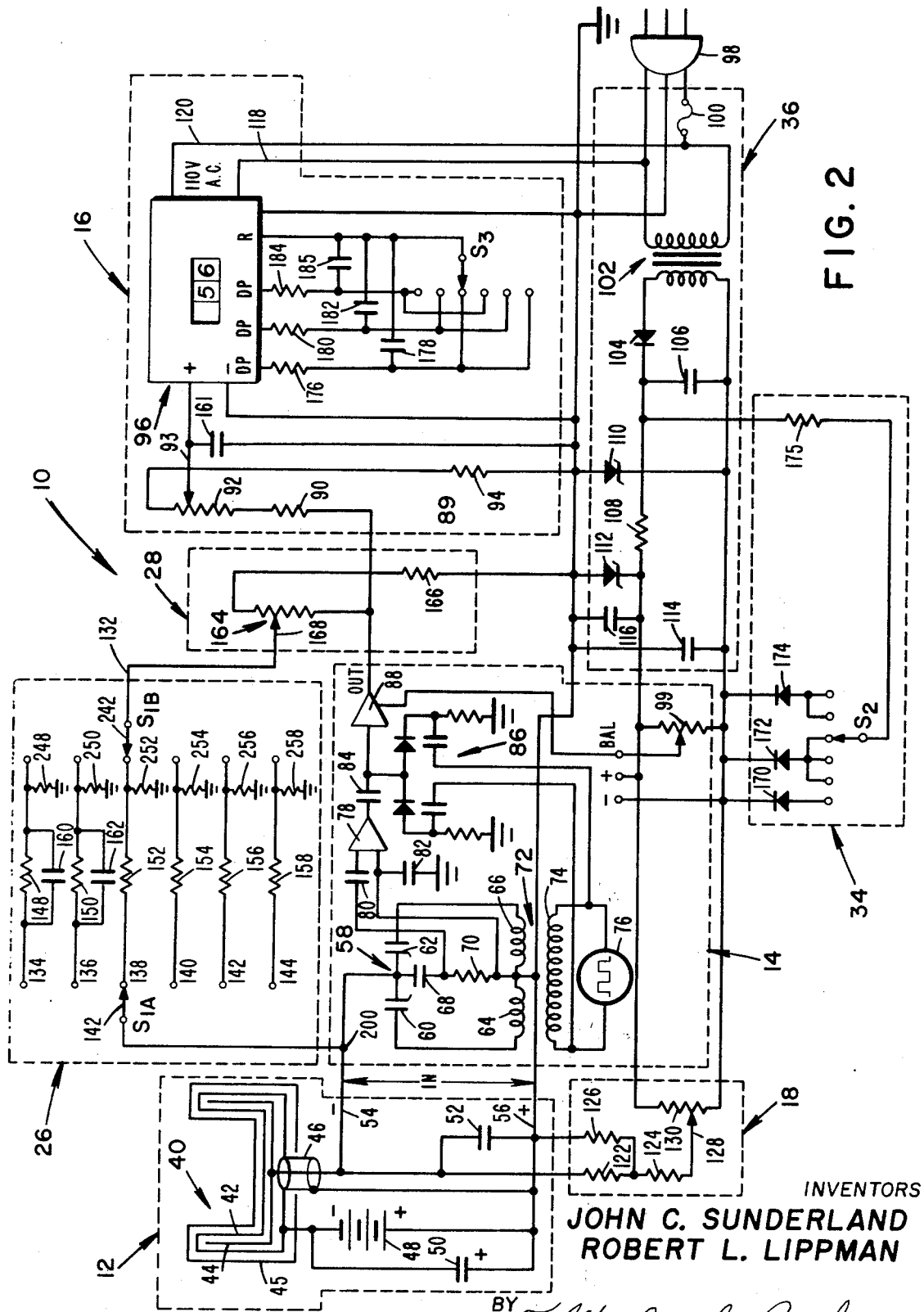
FIG. 2 is a detailed circuit diagram of the radiation indicator forming a part of the present invention.

With reference now to FIG. 2, the specific configuration of the inventive circuit will be described. In FIG. 2, the elements comprising the ionization chamber are enclosed within dashes and are represented generally at 12. Similarly, the varactor bridge operational amplifier is indicated at 14, the display device is indicated at 16, the background nulling circuit is indicated at 18, the range setting circuit is indicated at 26, and the calibration circuit is indicated at 28. In addition, the number 34 represents the portion of the circuit comprising a set of output lamps serving to indicate the range in which the display device 16 is operative. Number 36 similarly represents the power supply section of the circuit.

The ionization chamber section of the FIG. 2 circuit comprises, basically, an ionization chamber 40 having a high tension electrode 42 and a low tension electrode 44. The chamber is surrounded with a grounded safety shell 45. The output from the ionization chamber is in the form of a low-amplitude current which is extracted from coaxial output 46. The high tension electrode 42 associates with a source of high voltage 48 across which source is provided a relatively large capacitor 50. Capacitor 50 serves to further stabilize the voltage across the chamber thereby reducing effects of fluctuations in voltage on the output of the instrument. A filtering capacitor 52 serves to reduce the effects of noise associated with the chamber.

The current output from the ionization chamber section 12 is fed, via input lead 52 and ground lead 56, to the varactor bridge operational amplifier section 14. The varactor bridge is shown generally at 58, and comprises a pair of varactors 60 and 62, a pair of transformer windings 64 and 66, a DC blocking capacitor 68 and an output resistor 70. The transformer windings 64 and 66 form the secondary of a transformer indicated generally at 72, whose primary winding 74 is fed by an AC power source 76.

The portion of the operational amplifier described above functions as follows. The current input to the operational amplifier from the ionization chamber section 12 is fed to the junction between the branches of the bridge 58 containing the respective varactors 60 and 62. As the capacitance of the varactors changes with changes in the current applied thereto, changes in the output from the ionization chamber affect the balance of the bridge. The branches of the bridge containing windings 64 and 66 have applied thereto an induced signal from the primary winding 74 which winding is, in turn, activated by the AC power source 76. An AC signal appears across the output resistor 70 when the bridge is unbalanced, with the magnitude of such signal being directly related to the degree of bridge unbalance.

The carrier impressed across output resistor 70 is fed to a low noise AC amplifier 78 through a DC blocking capacitor 80, the input to amplifier 78 being grounded through a capacitor 82. The amplified signal from AC amplifier 78 is then passed through another blocking capacitor 84 and is demodulated by means of a phase-sensitive demodulator shown generally at 86. The demodulated signal is, in turn, fed to a high gain DC amplifier 88. The amplifier 14 is trimmed with the aid of variable resistor 89.

The amplified DC signal from the high gain DC amplifier 88 is fed directly to the digital voltmeter circuit shown generally at 16. This circuit 16 consists of an input section shown generally at 89, a digital voltmeter shown generally at 96, and means to provide AC mains power to the meter leads 118 and 120 and means to control its switch $S_3$ and resistors 176, 180, 184 and capacitors 178, 182, 186. The signal applied to the circuit 16 passes first through the input section 89, which provides means to acheive adjustable sensitivity, accomplished via an adjustable voltage divider consisting of fixed resistor 90, a resistor 92 with adjustable tap 93 and second fixed resistor 94, and means to attenuate noise from the chamber and amplifier circuits and to attenuate meter-produced transients, accomplished via filter capacitor 161 connected between tap 93 of resistor 92 and ground.

The power for the system is developed by the power supply section shown generally at 36. A 60 cycle AC signal is introduced to the circuit through a conventional plug 98, is fed through a fuse 100 and is impressed across the primary winding of a transformer shown generally at 102. The AC signal at the secondary winding of the transformer 102 is rectified by a diode 104 and is fed across an AC filtering capacitor 106. The rectified DC signal is fed through a voltage dropping resistor 108 and is then impressed upon first and second reference voltage zener diodes 110 and 112, diode 110 providing a source of negative potential and diode 112 a source of positive potential. The power supply section 36 is further provided with a pair of filtering capacitors 114 and 116. As can also be seen in FIG. 2, the digital voltmeter 96 receives power directly from the leads 118 and 120 on the AC side of transformer 102. It should be noted that a further advantage of this circuit design is its low current demands from the power supply, and further its insensitivity to the exact voltage of the power supply. Thus, for example, in some applications, the circuit could take its power from the power supply internal to the digital voltmeter.

As noted above, the inventive radiation indicator is provided with circuitry for eliminating the effects of background radiation, such circuitry being shown generally at 18 in FIG. 2. The background nulling circuit 18, in effect, serves to adjust a reference current level so that the overall output voltage attributable to the nulling circuit subtracts from the voltage developed by the sum of background radiation and other non-source related input currents and results in a zero reading on meter 96. The DC signal developed by the ionization chamber section 12 is fed to the summing node 200 of the varactor bridge operation amplifier 14. The background nulling circuit 18 feeds a current which is continuously adjustable from positive polarity through zero to negative polarity into the summing node 200.

The circuit 18 operates as follows. Tapped resistor 130 is connected between positive and negative voltage sources provided by zener diodes 112 and 110. Its tap 128 associates a source of potential adjustable from positive through zero to negative with a voltage divider consisting of resistors 124 and 126. The resultant divided voltage appearing at the junction of resistors 124 and 126 is associated with fixed high value resistor 122 so as to provide the aforementioned adjustable current to the summing node 200. As described above, the background nulling circuit first becomes operative when the ionization chamber 40 is empty. Then, the tap of the radiation indicator circuit 128 is adjusted until the reading on meter 96 indicates zero. At this time, the radiation indicator circuit is ready to perform a radiation measurement.

The range set circuit shown generally at 26 in FIG. 2 and the calibration circuit shown generally at 28 in FIG. 2 together comprise means for adjusting the transfer function of the resistor bridge operational amplifier 14. The range set switch provides means for selecting one of six feedback resistors 148, 150, 152, 154, 156 and 158, along with their associated integrating capacitors 160 and 162 (160 associating with 148 and 162 associating with 150). The calibration circuit provides means for achieving adjustable multiplication of the value of the feedback resistor selected by the range switch, with this multiplication factor being independent on the setting of the range switch.

Range set circuit 26 comprises a ganged pair of six position switches $S_{1A}$ and $S_{1B}$ which serve to associate with the summing node of the operational amplifier 14 and the calibration circuit 28, resistor-capacitor networks comprising resistor 148, capacitor 160 and resistor 248; resistor 150, capacitor 162 and resistor 250; resistor 157 and resistor 252; resistor 154 and resistor 254; resistor 156 and resistor 256; and resistor 158 and resistor 258. Switches $S_{1A}$ and $S_{1B}$ operate as in the following example. To associate the resistor-capacitor network comprising resistor 148, capacitor 160 and resistor 248 with the summing node 200 of operational amplifier 14 and the calibration circuit, wiper 142 of switch $S_{1A}$ is switched to contact 134 and simultaneously, as provided by a ganged linkage of the switch, the wiper 242 of switch $S_{1B}$ is switched to contact 234. In this position of switches $S_{1A}$ and $S_{1B}$ the resistor 148 acts as the feedback resistor, capacitor 160 serves to integrate out noise and resistor 248 has negligible effect on the operation of the circuit. However, resistors 250, 252, 254, 256 and 258 which are part of the resistor-capacitor networks not selected by switches $S_{1A}$ and $S_{1B}$, serve to connect the unselected networks to ground and thereby reduce the effects of leakage paths between such networks and the wiper 142 of switch $S_{1A}$. This position of switches $S_{1A}$ and $S_{1B}$ provides the feedback resistor of highest ohmic value (resistor 148) and hence selects the most sensitive range of the instrument. Resistors 150 through 158 are of successively decreasing ohmic value and yield ranges of successively decreasing sensitivity. It is unnecessary to provide capacitors across resistors 152 through 158 because of the low sensitivity of these ranges.

As explained above, the inventive radiation indicator includes a calibration circuit 28 which serves to adjust the gain of the circuit in accordance with the expected response from various radioisotopes under test. The calibration circuit programs the radiation indicator circuit to a particular radioisotope, the program being based upon known radiation from sample sources of known strength of the various radioisotopes. As shown generally at 28 in FIG. 2, the calibration circuit comprises, simply, an adjustably tapped resistor 164 in series with a fixed resistor 166 connected between it and ground. These two resistors serve to divide the output of the operational amplifier and associate the divided output on tap 168 of resistor 164 with wiper 242 of switch $S_{1B}$ of the range selector assembly. Thus, this circuit serves as a multiplier of the feedback resistor in use. The setting of the tap 168 of variable resistor 168 is performed externally and in accordance with the reading on a numerical calibration dial provided on the front of the radiation indicator panel. The particular numerical value is set as directed by a table of radioisotopes provided with the radiation indicator.

As switches $S_{1A}$ and $S_{1B}$ are simultaneously adjusted, so too is a switch $S_2$ forming a part of the output lamp circuit shown generally at 34. Switch $S_2$ is ganged to switches $S_{1A}$ and $S_{1B}$ and serves to turn on a lamp appropriate to the scale indicated on the meter 96. These lamps take the form of respective light emitting diodes 170, 172 and 174, and associate with resistor 175. These lamps indicate microcuries, millicuries and curies to provide a redundant safety feature.

Switches $S_{1A}$ and $S_{1B}$ are further ganged to a switch $S_3$ included in the display device 16. As switches $S_{1A}$ and $S_{1B}$ are six position switches, so too is switch $S_3$. In its respective switch positions, the switch $S_3$ is made to associate with resistor 176 and capacitor 178 in its first and fourth positions, with resistor 180 and capacitor 182 in its second and fifth positions, and with resistor 184 and capacitor 186 in its third and sixth positions. These associations accomplished through switch $S_3$ provide appropriately filtered voltages to power the decimal point indicators appropriate to the range selected.

In the specific circuit illustrated in FIG. 2, the element types and values are as follows:

| Capacitor | Value in mocrofarads unless specified | Resistors | Value in ohms |
|---|---|---|---|
| 50 | 1 | 89, 130, 158 | 100 K |
| 52 | 1000 pf | 90 | 20 K |
| 106 | 2500 | 92 | 2 K |
| 114, 116 | 0.1 | 94, 175 | 3.3 K |
| 160 | 39 pf | 108 | 100 |
| 162 | 220 pf | 122 | 500 M |
| 161 | 80 | 126, 164 | 1 K |
| 178, 182, 186 | 0.02 | 124, 156 | 1 M |
| | | 148 | 10,000 M |
| | | 150 | 1,000 M |
| DIODES | TYPE | | |
| | | 152 | 100 M |
| 104 | IN 4001 | 154 | 10 M |
| 110, 112 | SZ 15.0A | 162, 248, 250, 252, 254, 256, 258 | 10 K |
| 170, 172, 174 | MLED 60 0 (SSL 22) | 166 tm 56 | |
| | | 176, 180, 184 | 47 K |

Battery 48, 150 v.
Transformer 102, F 90 X

Above, a specific embodiment of the present invention has been described. It should be appreciated, however, that this embodiment is described for purposed of illustration only and that numerous alterations and modifications may be practiced by those skilled in the art without departing from the spirit and scope of the invention. Accordingly, it is the intent that the invention not be limited by the above, but be limited only as defined in the appended claims.

What is claimed is:

1. A radiation indicator particularly suited for converting the current output of an ionization chamber into a visual output, the indicator comprising: input means for accepting the DC output signals from an ionization chamber; high impedance, high gain amplifier means for converting said DC output signals into AC signals, amplifying such AC signals, and reconverting the same into DC signals; a bridge circuit forming the portion of said amplifier means for converting the DC output signals from said ionization chamber into AC signals, said bridge circuit including impedance means whose impedance varies in response to changes in said DC output signals; and a visual display device for the displaying of the output of said amplifier means, the reading of said display device being proportional to the radiation emitted by a sample housed in said ionization chamber.

2. The radiation indicator recited in claim 1, and further comprising a background nulling circuit for eliminating the effects of background noise, said background nulling circuit including a variable impedance member for the adjustment of a nulling signal introduced to said amplifier means.

3. The radiation indicator recited in claim 2, and further comprising means for adjusting the nulling signal introduced to said amplifier means so that the nulling signal is of an amplitude equal to and of a polarity opposite from the sum of all signals to said amplifier means generated by undesirable sources, radiation background, leakage currents, and the like.

4. The radiation indicator recited in claim 2, wherein said background nulling circuit further comprises: a source of reference voltage; a variable resistance element across which said reference voltage is impressed; a variable tap associated with said resistance element, the output of which tap is connected via a stable high value resistor to said input means; and means for adjusting said variable tap so that the display device reads zero when the ionization chamber is devoid of a sample.

5. The radiation indicator recited in claim 1, and further comprising a range set circuit for controlling the input signal to said display device, said range set circuit comprising a multi-position switch, respective impenance means for association with said amplifier means, the association of said respective impedance means with said amplifier means being controlled by the position of said switch, and noise filtering means bridging select ones of the respective impedance means.

6. The radiation indicator recited in claim 5, wherein said respective impedance means take the form of resistors, and wherein said noise filtering means take the form of capacitors.

7. The radiation indicator recited in claim 1, and further comprising calibration means for adjusting the input signal to said display device in accordance with known radiation responses from radiation sources similar to that under test.

8. The radiation indicator recited in claim 7, wherein said calibration means takes the form of a variable resistor operable external to said radiation indicator.

9. The radiation indicator recited in claim 1, wherein two branches of said bridge circuit contain solid state capacitive elements, the capacitance of which varies in accordance with the DC signals applied thereto, and two branches which include pulsed inductive elements for developing a modulated output from the bridge circuit.

10. The radiation indicator recited in claim 9, wherein the DC output signals from said ionization chamber are fed to the junction of the bridge branches housing said capacitive elements, and further comprising means for inducing pulsed signals in said inductive elements.

* * * * *